(12) United States Patent
Wedlock

(10) Patent No.: US 7,998,340 B2
(45) Date of Patent: *Aug. 16, 2011

(54) PROCESS TO PREPARE A BLENDED BRIGHTSTOCK

(75) Inventor: David John Wedlock, Chester (GB)

(73) Assignee: Shell Oil Company, Houston, TX (US)

( * ) Notice: Subject to any disclaimer, the term of this patent is extended or adjusted under 35 U.S.C. 154(b) by 489 days.

This patent is subject to a terminal disclaimer.

(21) Appl. No.: 11/922,622

(22) PCT Filed: Jul. 3, 2006

(86) PCT No.: PCT/EP2006/063798
§ 371 (c)(1),
(2), (4) Date: Dec. 20, 2007

(87) PCT Pub. No.: WO2007/003623
PCT Pub. Date: Jan. 11, 2007

(65) Prior Publication Data
US 2009/0111936 A1    Apr. 30, 2009

(30) Foreign Application Priority Data
Jul. 1, 2005  (EP) .................................... 05106023

(51) Int. Cl.
*C10M 111/00* (2006.01)
(52) U.S. Cl. ............. 208/19; 208/27; 208/950; 508/110
(58) Field of Classification Search ..................... 208/18, 208/19, 27
See application file for complete search history.

(56) References Cited

U.S. PATENT DOCUMENTS

| | | | |
|---|---|---|---|
| 3,576,735 A | 4/1971 | Murphy et al. .................. 208/27 |
| 4,574,043 A | 3/1986 | Chester et al. .................. 208/59 |
| 4,592,832 A | 6/1986 | Bristow et al. ................. 208/309 |
| 4,859,311 A | 8/1989 | Miller ............................. 208/89 |
| 5,053,373 A | 10/1991 | Zones ............................. 502/64 |
| 5,059,299 A | 10/1991 | Cody et al. ...................... 208/27 |
| 5,157,191 A | 10/1992 | Bowes et al. .................. 585/533 |
| 5,252,527 A | 10/1993 | Zones ............................. 502/64 |
| 5,292,426 A * | 3/1994 | Holland et al. .......... 208/111.25 |
| 6,051,129 A | 4/2000 | Harris et al. ................... 208/138 |
| 6,468,417 B1 | 10/2002 | Biscardi et al. ............... 208/299 |
| 6,774,272 B2 * | 8/2004 | Miller ............................ 585/241 |
| 6,846,778 B2 * | 1/2005 | Johnson et al. ............... 508/110 |
| 7,141,157 B2 * | 11/2006 | Rosenbaum et al. ........... 208/18 |
| 7,198,710 B2 * | 4/2007 | Miller et al. .................... 208/78 |
| 7,241,375 B2 * | 7/2007 | Johnson et al. ................. 208/19 |
| 7,597,795 B2 * | 10/2009 | Schleicher et al. ............. 208/87 |
| 7,601,253 B2 * | 10/2009 | Kaimai et al. .................. 208/19 |
| 7,687,445 B2 * | 3/2010 | Rosenbaum et al. ......... 508/591 |
| 2003/0100453 A1 | 5/2003 | O'Rear ........................ 508/110 |
| 2004/0065581 A1 | 4/2004 | Jiang et al. ...................... 208/18 |
| 2004/0065588 A1 | 4/2004 | Genetti et al. ................. 208/108 |
| 2004/0178118 A1 | 9/2004 | Rosenbaum et al. ........... 208/18 |
| 2009/0203835 A1 * | 8/2009 | Null et al. ..................... 524/570 |

FOREIGN PATENT DOCUMENTS

| | | |
|---|---|---|
| DE | 2011074 | 9/1970 |
| DE | 148062 | 5/1981 |
| EP | 582347 | 2/1994 |
| EP | 832171 | 4/1998 |
| GB | 1237291 | 6/1971 |
| GB | 1237292 | 6/1971 |
| GB | 1390953 | 4/1975 |
| GB | 1496045 | 12/1977 |
| JP | 63-309592 | 12/1988 |
| WO | WO9201657 | 2/1992 |
| WO | WO9220759 | 11/1992 |
| WO | WO9410264 | 5/1994 |
| WO | WO9718278 | 5/1997 |
| WO | WO9934917 | 7/1999 |
| WO | WO0029511 | 5/2000 |
| WO | WO0246333 | 6/2002 |
| WO | WO02070627 | 9/2002 |
| WO | WO2004007647 | 1/2004 |
| WO | WO2004033595 | 4/2004 |

OTHER PUBLICATIONS

Sequeira A., Jr.,: "Lubricant Base Oil and Wax Processing", Marcel Dekker, Inc., NY 1994, ISBN 0-8247-9256-4, pp. 53-80.
Ryland, L.B., et al.:"Cracking Catalysts, Catalysis", vol. VII, Ed. Paul H. Emmett, Reinhold Publishing Corporation, NY 1960, pp. 5-9.
International Search Report dated Oct. 17, 2006 (PCT/EP2006/063798).

* cited by examiner

*Primary Examiner* — Ellen McAvoy

(57) ABSTRACT

The invention relates to a bright stock base oil blend comprising of a paraffinic base oil component having a viscosity at 100° C. of from 8 to 25 mm$^2$/sec and a residual and de-asphalted oil component, and the use of said blend as part of a gear oil or a cylinder oil formulation, and other uses.

17 Claims, No Drawings

PROCESS TO PREPARE A BLENDED BRIGHTSTOCK

PRIORITY CLAIM

The present application claims priority to European Patent Application 05106023.4 filed 01 Jul. 2005.

FIELD OF THE INVENTION

The invention is directed to a brightstock blend, a process to prepare brightstock blends and their uses.

BACKGROUND OF THE INVENTION

Processes to prepare high viscosity base oils are described in GB-A-1496045. In this publication a process is described wherein a vacuum residue of a crude petroleum source is first subjected to a propane de-asphalting step to obtain a de-asphalted oil (DAO). The DAO is further subjected to a furfural extraction process to remove polycyclic compounds, which are undesirable because of their low viscosity index and oxidative stability. The oil obtained after furfural extraction is subjected to a solvent dewaxing step in order to reduce the pour point of the oil. The dewaxed oil is finally hydrofinished.

U.S. Pat. No. 4,592,832 discloses a process to prepare a brightstock oil having a kinematic viscosity at 100° C. of 37 $mm^2$/sec and a viscosity index of 95 as prepared from a light Arabian Vacuum Resid. The light Arabian Vacuum Resid is subjected to a propane de-asphalting step to prepare a DAO. The DAO is subjected to a N-methyl-pyrrolidone (NMP) solvent extraction step followed by dewaxing to obtain the Brightstock.

As a result of the above described process steps required to prepare a brightstock it is difficult to obtain a base oil having a combination of a high viscosity and a high viscosity index. Especially when starting from crudes having a lower content of saturates and/or VI contributing compounds than the light Arabian vacuum residue as illustrated in U.S. Pat. No. 4,592,832. This can be explained by the fact that the aromatic compounds as present in the DAO have a negative contribution to the viscosity index and have a relatively high viscosity whereas the saturates components have a lower viscosity contribution and variable VI contribution. Thus by removing these aromatic compounds in the solvent extraction step the viscosity index improves at the expense of the viscosity.

US-A-2003/0100453 discloses a blend of a Group I mineral derived base oil and Fischer Tropsch derived base oil. The blend is reported to show a better Oxidator A stability than the Fischer Tropsch oil, and a better Oxidator BN stability test than the Group I mineral derived base oil. A disadvantage of this blend is that at suitably high oxidative stabilities, solely those lube oils with suitably high viscosity index can be formulated that have a medium to low viscosity.

SUMMARY OF THE INVENTION

The invention is directed to the following composition: A bright stock base oil blend comprising a paraffinic base oil component having a viscosity at 100° C. of from 8 to 25 $mm^2$/sec, and a mineral derived residual and de-asphalted oil component in an amount of from 40 wt % to 99 wt %, based on the total weight of the oil blend.

The invention is also directed to the following process. Process to prepare an oil blend by performing a de-asphalting step on a mineral derived vacuum residue to obtain a de-asphalted oil, optionally solvent dewaxing the de-asphalted oil to obtain a dewaxeci de-asphalted oil component and blending a paraffinic base oil component having a viscosity at 100° C. of from 8 to 25 $mm^2$/sec with the dewaxed de-asphalted oil component, and/or with the extract obtained in the solvent extraction.

The invention is also directed to the use of the above oil blend or the oil blend as prepared by the above process as part of a industrial gear oil, and to gear oil formulations based on the blends.

The invention is further also directed to the use of the above oil blend or the oil blend as prepared by the above process as part of a slow speed two stroke engine cylinder oil.

In yet a further aspect, the invention is directed at the use of the blends as alternatives for various existing process oils such as TDAE (treated distillate aromatic extract), naphthenic and paraffinic process oils. These blends can be widely used as extender oil in rubber formulations (e.g. tyres and other automotive and technical rubber articles), rubber mould articles and seals.

DETAILED DESCRIPTION OF THE INVENTION

The oil blends according to the invention can be widely used as extender oil in rubber formulations (e.g. tyres and other automotive and technical rubber articles), rubber mould articles and seals. Applicants found that in particular blends containing a hazy paraffin base oil component as described above permitted to eliminate the use of microcrystalline wax additives that were required otherwise, while the low-temperature performance of the extended rubber article thus obtained was improved. The rubber extender oil composition produced by the process of the present invention may be used in synthetic rubbers, natural rubber and mixtures thereof. Examples of synthetic rubbers for which the rubber extender oil composition produced by the process of the present invention is suitable for include, but is not limited to, styrene-butadiene copolymers (SBR), polybutadiene (BR), polyisoprene (IR), polychloroprene (CR), ethylene-propylene-diene ternary copolymers (EPDM), acrylonitrile-butadiene rubber (NBR) and butyl rubber (IIR).

The blends can further be used as kneader oil in bunberry mixers, or as carrier oil in printing inks, and as carrier oil for additives. Other applications include the use of sand binders for metal casting, in the production of carbon black for printing inks, in electrical wire and cable insulating materials, and as dust binder oil.

Applicants found that high viscosity and high viscosity index brightstock oil blends are possible if a mineral derived residual and de-asphalted oil component is blended with a paraffinic base oil. The blend preferably has a kinematic viscosity at 100° C. of greater than 30 $mm^2$/sec. Preferably said viscosity is less than 40 $mm^2$/sec. The viscosity index of the blend is preferably greater than 95 and more preferably between 100 and 110. This blend is very attractive because its components are easily derivable. It was found that a de-asphalted oil component as present in this blend can be used which has not been subjected to a solvent extraction process or at least not to a very severe solvent extraction process. Thus the de-asphalted oil component of the blend can be prepared more simply than when using the process of GB-A-1496045. It was found that by blending a substantially paraffinic base oil to said component the solvent extraction could be reduced or even omitted resulting in a highly viscous oil blend having also a high viscosity index for these type of products.

The mineral derived residual and de-asphalted oil component is defined as the product of a de-asphalting process step wherein asphalt is removed from a reduced crude petroleum feed or from the residue, bottom fraction, of a vacuum distillation of a crude petroleum feed. The de-asphalting process utilizes a light hydrocarbon liquid solvent, for example propane, for asphalt compounds. De-asphalting processes are well known and for example described in Lubricant base oil and wax processing, Avilino Sequeira, Jr., Marcel Dekker, Inc, New York, 1994, ISBN 0-8247-9256-4, pages 53-80. The mineral derived residual and de-asphalted oil component as used in the blend according to the invention may be the DAO product as directly obtained in said de-asphalting process. Alternatively, the mineral derived residual and de-asphalted component may also be the aromatic extract as isolated from said de-asphalted component by solvent extraction in the case of applications where high oxidative stability is not required.

The mineral derived residual product may also be the mineral bright stock as obtained by solvent dewaxing the raffinate oil as obtained in the above referred to solvent extraction process. It has been found that excellent gear oil may be obtained when using in particular such mineral bright stock, which also show an increased oxidative stability. If gear oils are based on other blends according to the invention, i.e. DAO or DACO based blends, the wear performance was still excellent when compared to mineral derived oils, however in some cases the oxidative stability was not sufficient for certain applications.

Preferably the DAO product, its aromatic extract, or the raffinate obtained in the solvent extraction process is subjected to a dewaxing process. The dewaxing process is for example a solvent dewaxing process. The mineral derived residual and de-asphalted oil component preferably has a pour point of below $-3°$ C.

The DAO product may be subjected to a mild solvent extraction process in order to remove some of the aromatic compounds. It has been found that when the polar compounds content of resultant, optionally dewaxed, mineral derived residual and de-asphalted oil component is suitably between 60 and 80 wt % by IP 368, a solvent extraction can be omitted. The content of polar compounds in the oil blend is preferably below 60 wt % by IP 368.

Applicants found that commercially available under-extracted bright stock could be employed as mineral oil component, that does not meet the specification for mineral bright stock, i.e. that has a viscosity index of below 95, when blended with the paraffinic oil, the resulting blend typically at least meets, if not surpasses the bright stock specification in terms of oxidative stability and viscosity index. This can be advantageously employed to increase mineral oil yield.

Because a relatively high content of polar compounds may be present in this mineral oil component a relatively high viscosity of said oil is achievable. Preferably the kinematic viscosity at 100° C. of said oil is between 40 and 55 mm$^2$/sec. The viscosity index of the mineral derived residual and de-asphalted oil component is preferably between 50 and 85. In a preferred embodiment the mineral derived residual and de-asphalted oil component is a solvent dewaxed DAO which oil has not been subjected to a solvent extraction process. When reference is made to solvent extraction process, processes like for example the furfural or NMP solvent extraction processes are meant or other solvent extraction processes as for example described in Chapter 5 of the above referred to textbook titled "Lubricant base oil and wax processing".

The paraffinic base oil component preferably has a viscosity index of between 125 and 180. The kinematic viscosity at 100° C. of the paraffinic base oil is greater than 8, preferably greater than 12 mm$^2$/sec, more preferably greater than 15mm$^2$/sec. The combination of viscosity index and viscosity are typical for the preferred paraffinic base oil and differentiates the paraffinic base oil from the naphthenic base oil having much lower value for VI in this viscosity range. There is no preferred upper limit for the viscosity. However applicant found that a paraffinic base oil as derived from a Fischer-Tropsch wax having a kinematic viscosity at 100° C. of between 12 and 25 mm$^2$/sec, and more preferably between 15 and 25 mm$^2$/sec can be is used as paraffinic base oil component. The pour point of the paraffinic base oil is preferably below 0° C., more preferably below $-9°$ C. The pour point will suitably be above $-50°$ C.

More preferably the paraffinic base oil is prepared by hydroisomerisation of a paraffin wax, as prepared in a Fischer-Tropsch synthesis step, and dewaxing a residual fraction as separated from the effluent of said hydroisomerisation process. Examples of such processes suitable for preparing the paraffinic base oils are described in WO-A-2004/007647, US-A-US2004/0065588, WO-A-2004/033595 and WO-A-02070627, which publications are hereby incorporated by reference. Mixtures of the paraffinic base oils as prepared by these two processes may also be suitably used as the paraffinic base oil. Such mixtures are illustrated in the above referred to US-A-20040178118. A disadvantage of the process of US-A-20040178118 is that in order to achieve a high viscosity for the desired paraffinic base oil first two base oils must be prepared having a low and high viscosity by two different processes. More preferred is to prepare the paraffinic base oil in a single process involving hydroisomerisation of a relatively heavy paraffinic wax, as prepared in a Fischer-Tropsch synthesis step, and dewaxing a residual fraction as separated from the effluent of said hydroisomerisation process.

This relatively heavy feed to the hydroisomerisating step has suitably a weight ratio of compounds having at least 60 or more carbon atoms and compounds having at least 30 carbon atoms of at least 0.2, preferably at least 0.4 and more preferably at least 0.55. Furthermore the feed has at least 30 wt %, preferably at least 50 wt % and more preferably at least 55 wt % of compounds having at least 30 carbon atoms. Such a feed preferably comprises a Fischer-Tropsch product, which in turn comprises a $C_{20}+$ fraction having an ASF-alpha value (Anderson-Schulz-Flory chain growth factor) of at least 0.925, preferably at least 0.935, more preferably at least 0.945, even more preferably at least 0.955. The initial boiling point of the feed is preferably below 200° C. Preferably any compounds having 4 or less carbon atoms and any compounds having a boiling point in that range are not present in said feed. The feed may also comprise process recycles and/or off-spec base oil fractions as obtained after dewaxing.

A suitable Fischer-Tropsch synthesis process, which may yield a relatively heavy Fischer-Tropsch product, is for example described in WO-A-9934917.

The process will generally comprise a Fischer-Tropsch synthesis to obtain a Fischer-Tropsch wax, a hydroisomerisation step and a pour point reducing step of a residual fraction, comprising (a) hydrocracking/hydroisomerisating a Fischer-Tropsch wax,
(b) separating from the product of step (a) a distillation residue and
(c) dewaxing the distillation residue to obtain the paraffinic base oil and an optionally.
(d) a re-distillation of the paraffinic base oil to remove light ends such to obtain a residual paraffinic base oil having the desired viscosity.

The hydroconversion/hydroisomerisation reaction of step (a) is preferably performed in the presence of hydrogen and a catalyst, which catalyst can be chosen from those known to one skilled in the art as being suitable for this reaction of which some will be described in more detail below. The catalyst may in principle be any catalyst known in the art to be suitable for isomerising paraffinic molecules. In general, suitable hydroconversion/hydroisomerisation catalysts are those comprising a hydrogenation component supported on a refractory oxide carrier, such as amorphous silica-alumina (ASA), alumina, fluorided alumina, molecular sieves (zeolites) or mixtures of two or more of these. One type of preferred catalysts to be applied in the hydroconversion/hydroisomerisation step in accordance with the present invention are hydroconversion/hydroisomerisation catalysts comprising platinum and/or palladium as the hydrogenation component. A very much preferred hydroconversion/hydroisomerisation catalyst comprises platinum and palladium supported on an amorphous silica-alumina (ASA) carrier. The platinum and/or palladium is suitably present in an amount of from 0.1 to 5.0% by weight, more suitably from 0.2 to 2.0% by weight, calculated as element and based on total weight of carrier. If both present, the weight ratio of platinum to palladium may vary within wide limits, but suitably is in the range of from 0.05 to 10, more suitably 0.1 to 5. Examples of suitable noble metal on ASA catalysts are, for instance, disclosed in WO-A-9410264 and EP-A-0582347. Other suitable noble metal-based catalysts, such as platinum on a fluorided alumina carrier, are disclosed in e.g. U.S. Pat. No. 5,059,299 and WO-A-9220759.

A second type of suitable hydroconversion/hydroisomerisation catalysts are those comprising at least one Group VIB metal, preferably tungsten and/or molybdenum, and at least one non-noble Group VIII metal, preferably nickel and/or cobalt, as the hydrogenation component. Both metals may be present as oxides, sulphides or a combination thereof. The Group VIB metal is suitably present in an amount of from 1 to 35% by weight, more suitably from 5 to 30% by weight, calculated as element and based on total weight of the carrier. The non-noble Group VIII metal is suitably present in an amount of from 1 to 25 wt %, preferably 2 to 15 wt %, calculated as element and based on total weight of carrier. A hydroconversion catalyst of this type, which has been found particularly suitable, is a catalyst comprising nickel and tungsten supported on fluorided alumina.

The above non-noble metal-based catalysts are preferably used in their sulphided form. In order to maintain the sulphided form of the catalyst during use some sulphur needs to be present in the feed. Preferably at least 10 mg/kg and more preferably between 50 and 150 mg/kg of sulphur is present in the feed.

A preferred catalyst, which can be used in a non-sulphided form, comprises a non-noble Group VIII metal, e.g., iron, nickel, in conjunction with a Group IB metal, e.g., copper, supported on an acidic support. Copper is preferably present to suppress hydrogenolysis of paraffins to methane. The catalyst has a pore volume preferably in the range of 0.35 to 1.10 ml/g as determined by water absorption, a surface area of preferably between 200-500 m$^2$/g as determined by BET nitrogen adsorption, and a bulk density of between 0.4-1.0 g/ml. The catalyst support is preferably made of an amorphous silica-alumina wherein the alumina may be present within wide range of between 5 and 96 wt %, preferably between 20 and 85 wt %. The silica content as SiO2 is preferably between 15 and 80 wt %. Also, the support may contain small amounts, e.g., 20-30 wt %, of a binder, e.g., alumina, silica, Group IVA metal oxides, and various types of clays, magnesia, etc., preferably alumina or silica.

The preparation of amorphous silica-alumina microspheres has been described in Ryland, Lloyd B., Tamele, M. W., and Wilson, J. N., Cracking Catalysts, Catalysis: volume VII, Ed. Paul H. Emmett, Reinhold Publishing Corporation, New York, 1960, pp. 5-9.

The catalyst is prepared by co-impregnating the metals from solutions onto the support, drying at 100-150° C., and calcining in air at 200-550° C. The Group VIII metal is present in amounts of about 15 wt % or less, preferably 1-12 wt %, while the Group IB metal is usually present in lesser amounts, e.g., 1:2 to about 1:20 weight ratio respecting the Group VIII metal.

A typical catalyst is shown below:

| | |
|---|---|
| Ni, wt % | 2.5-3.5 |
| Cu, wt % | 0.25-0.35 |
| $Al_2O_3$—$SiO_2$ wt % | 65-75 |
| $Al_2O_3$ (binder) wt % | 25-30 |
| Surface Area | 290-325 m$^2$/g |
| Pore Volume (Hg) | 0.35-0.45 ml/g |
| Bulk Density | 0.58-0.68 g/ml |

Another class of suitable hydroconversion/hydroisomerisation catalysts are those based on zeolitic materials, suitably comprising at least one Group VIII metal component, preferably Pt and/or Pd, as the hydrogenation component. Suitable zeolitic and other aluminosilicate materials, then, include Zeolite beta, Zeolite Y, Ultra Stable Y, ZSM-5, ZSM-12, ZSM-22, ZSM-23, ZSM-48, MCM-68, ZSM-35, SSZ-32, ferrierite, mordenite and silica-aluminophosphates, such as SAPO-11 and SAPO-31. Examples of suitable hydroisomerisation/hydroisomerisation catalysts are, for instance, described in WO-A-9201657. Combinations of these catalysts are also possible. Very suitable hydroconversion/hydroisomerisation processes are those involving a first step wherein a zeolite beta based catalyst is used and a second step wherein a ZSM-5, ZSM-12, ZSM-22, ZSM-23, ZSM-48, MCM-68, ZSM-35, SSZ-32, ferrierite, mordenite based catalyst is used. Of the latter group ZSM-23, ZSM-22 and ZSM-48 are preferred. Examples of such processes are described in US-A-2004/0065581 and US-A-2004/0065588. In the process of US-A-2004/0065588 steps (a) and (c) as meant in the context of the present description are performed using the same ZSM-48 based catalyst.

Combinations wherein the Fischer-Tropsch product is first subjected to a first hydroisomerisation step using the amorphous catalyst comprising a silica-alumina carrier as described above followed by a second hydroisomerisation step using the catalyst comprising the molecular sieve has also been identified as a preferred process to prepare the base oil to be used in the present invention. More preferred the first and second hydroisomerisation steps are performed in series flow.

In step (a) the feed is contacted with hydrogen in the presence of the catalyst at elevated temperature and pressure. The temperatures typically will be in the range of from 175 to 380° C., preferably higher than 250° C. and more preferably from 300 to 370° C. The pressure will typically be in the range of from 10 to 250 bar and preferably between 20 and 80 bar. Hydrogen may be supplied at a gas hourly space velocity of from 100 to 10000 Nl/l/hr, preferably from 500 to 5000 Nl/l/hr. The hydrocarbon feed may be provided at a weight hourly space velocity of from 0.1 to 5 kg/l/hr, preferably higher than 0.5 kg/l/hr and more preferably lower than 2 kg/l/hr. The ratio of hydrogen to hydrocarbon feed may range from 100 to 5000 Nl/kg and is preferably from 250 to 2500 Nl/kg.

The conversion in step (a) as defined as the weight percentage of the feed boiling above 370° C. which reacts per pass to a fraction boiling below 370° C., is at least 20 wt %, preferably at least 25 wt %, but preferably not more than 80 wt %, more preferably not more than 65 wt %. The feed as used above in the definition is the total hydrocarbon feed fed to step (a), thus also any optional recycle of a high boiling fraction which may be obtained in step (b).

In step (b) a residue is isolated from the product of step (a). With a residue is here meant that the most highest boiling compounds as present in the effluent of step (a) are part of the residue. Distillation may be performed at atmospheric pressure as illustrated in WO-A-02/070627 or lower as illustrated in WO-A-2004/007647.

Step (c) may be performed by means of solvent or catalytic dewaxing. Solvent dewaxing is advantageous because a haze free paraffinic oil may then be obtained as for example described in WO-A-0246333. A haze free base oil is defined as a composition having a cloud point of below 15° C. A hazy paraffinic base oil has a cloud point of 15° C. and above. Catalytic dewaxing may yield a hazy paraffinic base oil as is illustrated in WO-A-2004/033595 and 2004/0065588. Catalytic dewaxing is however preferred over solvent dewaxing due to its simpler operation. Processes have therefore been developed to remove the haze from a hazy paraffinic base oil as obtained by catalytic dewaxing. Examples of said processes are U.S. Pat. No. 6,051,129, US-A-2003/0075477 and U.S. Pat. No. 6,468,417. Applicants now found that when a hazy paraffinic base oil as prepared by catalytic dewaxing is used to prepare the blended oil a clear and bright product is obtained. Thus a very interesting use is found for such a hazy paraffinic base oil as obtained from a Fischer-Tropsch wax.

Dewaxing is preferably performed by catalytic dewaxing. Catalytic dewaxing is well known to the skilled reader and is suitably performed in the presence of hydrogen and a suitable heterogeneous catalysts comprising a molecular sieve and optionally in combination with a metal having a hydrogenation function, such as the Group VIII metals. Molecular sieves, and more suitably intermediate pore size zeolites, have shown a good catalytic ability to reduce the pour point of a base oil precursor fraction under catalytic dewaxing conditions. Preferably the intermediate pore size zeolites have a pore diameter of between 0.35 and 0.8 nm. Suitable intermediate pore size zeolites are mordenite, ZSM-5, ZSM-12, ZSM-22, ZSM-23, SSZ-32, ZSM-35 and ZSM-48. Another preferred group of molecular sieves are the silica-alumina-phosphate (SAPO) materials of which SAPO-11 is most preferred as for example described in U.S. Pat. No. 4,859,311. ZSM-5 may optionally be used in its HZSM-5 form in the absence of any Group VIII metal. The other molecular sieves are preferably used in combination with an added Group VIII metal. Suitable Group VIII metals are nickel, cobalt, platinum and palladium. Examples of possible combinations are Ni/ZSM-5, Pt/ZSM-23, Pd/ZSM-23, Pt/ZSM-48 and Pt/SAPO-11. Further details and examples of suitable molecular sieves and dewaxing conditions are for example described in WO-A-9718278, U.S. Pat. Nos. 5,053,373, 5,252,527, 4,574,043, 5,157,191, WO-A-0029511, EP-A-832171.

Catalytic dewaxing conditions are known in the art and typically involve operating temperatures in the range of from 200 to 500° C., suitably from 250 to 400° C., hydrogen pressures in the range of from 10 to 200 bar, preferably from 40 to 70 bar, weight hourly space velocities (WHSV) in the range of from 0.1 to 10 kg of oil per litre of catalyst per hour (kg/l/hr), suitably from 0.2 to 5 kg/l/hr, more suitably from 0.5 to 3 kg/l/hr and hydrogen to oil ratios in the range of from 100 to 2,000 litres of hydrogen per litre of oil.

From the effluent of step (c) the desired paraffinic base oil having the required viscosity made be directly obtained. If required any lower boiling compounds may be removed in a step (d) by distillation such to meet said viscosity requirements as specified above.

The invention is also directed to a process to prepare the oil blend described above by performing a de-asphalting step on a mineral derived vacuum residue to obtain a de-asphalted oil, extracting from the de-asphalted oil an aromatic extract by solvent extraction process and blending the paraffinic base oil component with the aromatic extract. If required the aromatic extract is first subjected to a solvent dewaxing before blending. Dewaxing may be required if the cold flow properties of the resultant blend are to be improved. Alternatively a blend of the aromatic extract and a paraffinic base oil component or a paraffinic base oil precursor component may be subjected to a solvent or catalytic dewaxing dewaxed step to obtain the brightstock blend. The paraffinic base oil precursor component is preferably obtained from a Fischer-Tropscsh wax by a process involving steps (a) and (b). The residue obtained in (b) may have been partly dewaxed in order to make the precursor material easier to handle in transport and to increase its heavy oil content. Preferably the paraffinic base oil precursor material has a pour point of between 0 and 100° C., more preferably between 20 and 60° C.

More preferably the oil blend described above is prepared by performing a de-asphalting step on a mineral derived vacuum residue to obtain a de-asphalted oil, solvent dewaxing the de-asphalted oil to obtain a dewaxed de-asphalted oil component and blending the paraffinic base oil component with the dewaxed de-asphalted oil component. This process is advantageous because a brightstock type product can be prepared without having to perform a solvent extraction step. Solvent extraction is a very complex process and by being able to omit such a process a very cost effective process is obtained. Additionally a yield increase on the mineral component of the blended base oil is obtained by utilising the heavy aromatic molecules that would otherwise have been extracted by the solvent extraction process.

Applicants also found that it is possible to use a hazy paraffinic base oil as described above. It has been found that a clear oil blend is obtained when the blending involving the hazy paraffinic base oil is performed at a temperature of greater than 50° C. In an alternative process the oil blend according to the present invention is prepared by performing a de-asphalting step on a mineral derived vacuum residue to obtain a de-asphalted oil, mixing a paraffinic base oil component or a paraffinic base oil precursor component as described above with the de-asphalted oil component and performing a catalytic or preferably a solvent dewaxing step on the mixture. The oil blends may also find application as cable oils.

Applicants further found that if the mineral derived bright stock was a residual base oil based on the raffinate of the a deasphalted oil, which raffinate had further been solvent dewaxed, the obtained blends with the paraffinic base oil could be formulated into gear oils having a surprisingly large increase in wear stability together with an increased oxidation stability.

Accordingly, the present invention also relates to the use of the bright stock blends according to the invention as component in an industrial gear oil, and also to gear oil formulations comprising the bright stock blends according to the invention. Examples of suitable gear oils are gear lubricant formulations according to ISO 320 or ISO 460.

Another preferred application is as part of a cylinder oil. Cylinder oils are preferably used on a once-through basis by means of injection devices that apply the cylinder oil to lubricators positioned around the cylinder liner of a slow speed diesel engine. Diesel engines may generally be classified as slow-speed, medium-speed or high-speed engines, with the slow-speed variety being used for the largest, deep draft vessels and in industrial applications. Slow-speed diesel engines are typically direct coupled, direct reversing, two-stroke cycle engines operating in the range of about 57 to 250 rpm and usually run on residual fuels. These engines are of crosshead construction with a diaphragm and stuffing boxes separating the power cylinders from the crankcase to prevent combustion products from entering the crankcase and mixing with the crankcase oil. Medium-speed engines typically operate in the range of 250 to about 1100 rpm and may operate on the four-stroke or two-stroke cycle. These engines are trunk piston design, and many operate on residual fuel as well. They may also operate on distillate fuel containing little or no residua. On deep-sea vessels these engines may be used for propulsion, ancillary applications or both. Slow speed and medium speed marine diesel engines are also extensively used in power plant operations. The present invention is applicable to them as well.

Each type of diesel engine employs lubricating oils to lubricate piston rings, cylinder liners, bearings for crank shafts and connecting rods, valve train mechanisms including cams and valve lifters, among other moving members. The lubricant prevents component wear, removes heat, neutralizes and disperses combustion products, prevents rust and corrosion, and prevents sludge formation or deposits. In low-speed marine crosshead diesel engines, the cylinders and crankcase are lubricated separately, with cylinder lubrication being provided on a once-through basis by means of injection devices that apply cylinder oil to lubricators positioned around the cylinder liner. This is known as an "all-loss" lubrication system. The cylinder oil is typically formulated to provide for good oxidation and thermal stability, water demulsability, corrosion protection and good antifoam performance. Alkaline detergent additives are also present to neutralize acids formed during the combustion process. Dispersant, antioxidant, antifoam, antiwear and extreme pressure (EP) performance may also be provided by the use of suitable additives.

The cylinder oil according to the present invention comprises (i) the brightstock blend, the paraffinic base oil component or the hazy paraffinic base oil component and (ii) one or more additives selected from dispersants, overbased detergents, antiwear agents, friction reducing agents, viscosity improvers, viscosity thickeners, metal passivators, acid sequestering agents and antioxidants. More preferably all of the listed additives are present. Examples of such additives are for example described in U.S. Pat. No. 6,596,673, which publication is hereby incorporated by reference.

Applicants found that not only the brightstock blends according to the present invention, but also the paraffinic base oil itself may be used advantageously as part of a cylinder oil formulation. Applicants further found that the hazy paraffinic oil as described above may also be used as the base oil component of such a cylinder oil. The presence of the haze, especially when also overbased detergents are present in the cylinder oil formulation, does not negatively affect the properties of the cylinder oil in its intended use. Preferably the, optionally hazy, paraffinic base oil is the only base oil component in the cylinder oil formulation. In case the cylinder oil is based exclusively on the paraffinic base oil the fully formulated oil preferably has a kinematic viscosity at 100° C. of between 12 and 22 mm²/sec.

The presence of such a paraffinic oil component, optionally as part of the brightstock blend, will provide the cylinder oil with a high viscosity index. The high VI will give the added benefit of easier pumping from the lubricant oil tank under low temperature conditions, as well as a higher oil film thickness under high temperature operating conditions within the cylinder, compared to the analogous all-mineral lower VI formulations.

The invention will be illustrated by the following non-limiting examples.

Example 1

Oil blends A-D were made using the base oils listed in Table 1. All blends were clear and bright at room temperature (20° C.). The properties of the blends are listed in Table 3.

TABLE 1

| | Kinematic viscosity at 100° C. (mm²/sec) | Kinematic viscosity at 40° C. (mm²/sec) | VI | Pour Point (° C.) | Cloud Point (° C.) | Appearance |
|---|---|---|---|---|---|---|
| Dewaxed DAO | 52.54 | 1390.7 | 79 | −6 | −9 | |
| Hazy Paraffinic base oil (*) | 13.47 | 92.0 | 147 | −9 | >20 | Hazy |
| Non-hazy paraffinic base oil | 16.32 | 120.6 | 145.4 | −42 | −14 | Clear and bright |

(*) the oil showed a haze at ambient conditions

The dewaxed DAO of Table 1 was obtained from Shell Nederland Verkoop Maatschappij BV as its commercial product listed "MVIP 1300". This product was prepared by subjecting a residual crude petroleum fraction to a propane de-asphalting step followed by solvent dewaxing using (50 vol %/50 vol %) methyl-ethylketone.

The hazy paraffinic base oils of Table 1 were obtained by the following process. From a hydroisomerised Fischer-Tropsch wax a distillation residue was isolated having the properties as listed in Table 2.

TABLE 2

| Feed to catalytic dewaxing | | |
|---|---|---|
| Congealing Point | ° C. | 71 |
| IBP % m distilled | ° C. | 302 |
| 10 | ° C. | 402 |
| 50 | ° C. | 548 |
| 70 | ° C. | 613 |
| 90 | ° C. | 706 |
| FBP | ° C. | >720 |

The above residue was contacted with a dewaxing catalyst consisting of 0.7 wt % platinum, 25 wt % ZSM-12 and a silica binder. The dewaxing conditions were 40 bar hydrogen, WHSV=1 kg/l.h, and a hydrogen gas rate of 500 Nl/kg feed. The experiment was carried out at 300 and 325° C. From the effluent a residue boiling above 490° C. was isolated to obtain a hazy base oil of Table 1. The oil obtained at 325° C. was subjected to a solvent dewaxing at −20° C. The solvent was a 50 vol % methyl ethylketone and 50 vol % toluene to obtain the clear and bright base oil of Table 1.

TABLE 3

| Blend | A | B | C | D |
|---|---|---|---|---|
| Content of MVIP1300 (wt %) | 69 | 63 | 75 | 70 |
| Content of Hazy paraffinic base oil (wt %) | 31 | — | 25 | — |
| Content of Non-hazy paraffinic base oil (wt %) | — | 37 | — | 30 |
| Kinematic viscosity at 100° C. (mm$^2$/sec) | 28.6 | 28.1 | 31.59 | 31.86 |
| Viscosity index | 100 | 103 | 95 | 97 |
| Pour point (° C.) | −9 | −12 | −2 | −4 |
| Cloud point (° C.) | — | −19 | 14 | −4 |
| Polar compounds (wt %) | 51.8 | 47.4 | 56.2 | 52.5 |

Example 2

Two blends were prepared from two different mineral-derived brightstocks having a kinematic viscosity at 100° C. of 32 mm$^2$/sec (cSt), and a hazy paraffinic base oil having a kinematic viscosity at 100° C. of 19 mm$^2$/sec, an iso to normal paraffinic ratio of more than 3:1 (as produced by a Fischer-Tropsch process employing a heavy feed described hereinabove) by heating the components to 50° C., and blending them together.

Blend A comprised 58.36% wt. of the above-described paraffinic base oil and 41.64% wt. of a Middle East mineral oil derived bright stock (Bright stock 1 in table 4). Blend B comprised 53.70% wt. of the above-described paraffinic base oil and 46.30% wt. of a less severely extracted Kaspian mineral oil derived bright stock (Bright stock 2 in table 4).
The properties of the bright stocks were as follows (see table 4):

TABLE 4

| | | bright stock properties | | |
|---|---|---|---|---|
| Oil | Method | | Bright Stock 1 | Bright Stock 2 |
| Kinematic Viscosity at 100° C. | D44 | [mm$^2$/s] | 31.8 | 28.0 |
| Kinematic Viscosity at 40° C. | D44 | [mm$^2$/s] | 491 | 444 |
| Viscosity index | D227 | | 96 | 88 |
| Total Polar content | IP368 | [%] | | |
| Aromatics | | | 43 | 53 |
| Saturates | | | 57 | 46 |
| Recoverable | | | 98 | 97 |
| Pour point | D595 | [° C.] | −9 | −15 |

Comparative blend A was composed of base oils and bright stock derived from Middle East mineral oil. In particular, the blend was composed of 2.5% wt. of a Group I high viscosity index base oil having a viscosity of 105 Redwood seconds at 60° C., 20.5% wt. of a Group I high viscosity index base oil having a viscosity of 160 Redwood seconds at 60° C., also referred to in the industry as an ISO 100 grade base oil, and 57.2% wt. of a bright stock having a viscosity of 650 Redwood seconds at 60° C., the latter also referred to ir the industry as a 150 BS, i.e. a bright stock having a viscosity of 150 Saybolt seconds at 98.9° C.

The blends were clear and bright, and had each a kinematic viscosity at 100° C. of approx. 25 mm$^2$/sec (cSt), a kinematic viscosity at 40° C. of approx. 260 mm$^2$/sec (cSt), and a viscosity index of 125.

The blends were formulated into ISO 220 and ISO 460 industrial gear oil formulations (using a commercially available antioxidant and wear improver additive package), and by adjusting the final formulation viscosity to meet ISO 220 or ISO 460 viscometric requirements. As comparative examples, a formulation was prepared employing mineral-derived high viscosity index brightstock and distillate base oils formulation. The gear oil formulations were then subjected to an oxidation test according to ASTM D2893 for 13 Days at 121° C., and to a modified FZG wear performance test according to ASTM D4998 (see table 5).

TABLE 5

COMPARATIVE OXIDATION AND WEAR TESTS ON ISO 220 OILS

| | Experimental Blend | | | | | |
|---|---|---|---|---|---|---|
| | A | | B | | Comparative A | |
| | % m/m | Component | % m/m | Component | % m/m | Component |
| Formulation | 1.50 | Additive package | 1.50 | Additive package | 1.50 | Additive package |
| | 0.30 | Pour point depressant | 0.30 | Pour point depressant | 0.30 | Pour point depressant |
| | 98.20 | Blend A | 98.20 | Blend B | 98.20 | Comp. Blend A |
| | 2 ppm | Defoamer | 2 ppm | Defoamer | 2 ppm | Defoamer |
| Blend Appearance | | Cloudy, pale amber oily liquid | | Hazy, pale amber oily liquid | | Clear, amber oily liquid |
| Vk 100° C. (mm$^2$/s) Start of Test | 22.18 | | 21.39 | | 18.85 | |
| Vk 40° C. (mm$^2$/s) Start of Test | 213.36 | | 208.96 | | 217.05 | |

TABLE 5-continued

COMPARATIVE OXIDATION AND WEAR TESTS ON ISO 220 OILS

| | Experimental Blend | | |
|---|---|---|---|
| | A | B | Comparative A |
| | % m/m  Component | % m/m  Component | % m/m  Component |
| VI | 126 | 122 | 97 |
| Vk 100° C. (mm$^2$/s) End of Test | a) 22.69 b) 22.69 | a) 22.12 b) 22.13 | a) 19.50 b) 19.54 |
| % Change | a) 2.30 b) 2.30 | a) 3.41 b) 3.46 | a) 3.45 b) 3.66 |
| Appearance of oils and oxidation tubes at End of Test | Oils: Hazy, dark brown oily liquids. Tubes: Clear walls, small amount of sediment covering the base of the tubes. | Oils: Slightly hazy, red-brown oily liquids. Tubes: Clear walls, small amount of sediment covering the base of the tubes. | Oils: Clear, red-brown oily liquids. Tubes: Hazy film on walls of tubes, small amount of sediment covering the base of the tubes. |
| ASTM D 4998 Wear testing for 20 and 60 hour running times | | | |
| Weight loss after 20 hours running | 8 mg | 8 mg | 24 mg |
| Weight loss after 60 hours running | 16 mg | 17 mg | 36 mg |

Table 5 shows that both the oxidational stability of the gear oil was improved as well as the wear performance. The latter improved by a factor of about 2 by the use of a blend of a mineral derived bright stock and a paraffinic oil component in the gear oil formulation.

What is claimed is:

1. A bright stock base oil blend comprising a paraffinic base oil component having a kinematic viscosity at 100° C. of between 12 and 25 mm$^2$/sec and derived from a Fischer-Tropsch wax, and a mineral derived residual and de-asphalted oil component, wherein the blend has a kinematic viscosity at 100° C. of greater than 30 mm$^2$/sec and a viscosity index of greater than 95.

2. The base oil blend according to claim 1, wherein the mineral derived residual and de-asphalted oil component is present in an amount of from 40 wt % to 99 wt %, based on the total weight of the oil blend.

3. The base oil blend according to claim 1, wherein the viscosity index is between 100 and 110.

4. The base oil blend according to claim 1, wherein the blend has a kinematic viscosity at 100° C. of less than 40 mm$^2$/sec.

5. The base oil blend according to claim 1 wherein the mineral derived residual and de-asphalted oil component has a pour point of below −3° C., a viscosity index of between 70 and 85 and a polar compounds content of between 60 and 80 wt % by IP 368.

6. The base oil blend according to claim 1, wherein the paraffinic base oil component has a viscosity index of between 125 and 180.

7. The base oil blend according to claim 1, wherein the content of polar compounds in the blend is below 60 wt % by IP 368.

8. The base oil blend according to claim 1, wherein the difference in cloud point and pour point of the paraffinic base oil component is greater than 25° C. and wherein the difference in cloud point and pour point of the base oil blend is smaller than 25 C.

9. A process to prepare a base oil blend according to claim 1, by performing a de-asphalting step on a mineral derived vacuum residue to obtain a de-asphalted oil, solvent dewaxing the de-asphalted oil to obtain a dewaxed de-asphalted oil component and blending the paraffinic base oil component with the dewaxed de-asphalted oil component.

10. A process to prepare a base oil blend according to claim 1, by performing a de-asphalting step on a mineral derived vacuum residue to obtain a de-asphalted oil, extracting from the de-asphalted oil an aromatic extract by solvent extraction process, and blending the paraffinic base oil component with the aromatic extract.

11. A process to prepare a base oil blend according to claim 1, by performing a de-asphalting step on a mineral derived vacuum residue to obtain a de-asphalted oil mixing the paraffinic base oil component or a paraffinic base oil precursor component with the de-asphalted oil component and performing a solvent dewaxing step on the mixture.

12. A process to prepare a base oil blend according to claim 1, by:
(i) performing a de-asphalting step on a mineral derived vacuum residue to obtain a de-asphalted oil, and (ii) extracting from the de-asphalted oil an aromatic extract by solvent extraction process to obtain an extract and a raffinate, and (iii) solvent dewaxing the raffinate obtained in (ii) to obtain a bright stock, and (iv) and blending the bright stock with the paraffinic base oil component.

13. A process according to claim 9, wherein the paraffinic base oil component has a difference in cloud point and pour point of greater than 25° C. and wherein the blending is performed at a temperature of greater than 50° C.

14. A gear oil formulation comprising a base oil blend according to claim 1, and further comprising one or more additives selected from the group consisting of dispersants, overbased detergents, antiwear agents, friction reducing agents, viscosity improvers, viscosity thickeners, metal passivators, acid sequestering agents and antioxidants.

15. A cylinder oil formulation for use in slow speed diesel engines comprising (i) a baseoil blend according to claim 1, a paraffinic base oil component or a hazy paraffinic base oil component and (ii) one or more additives selected from the group consisting of dispersants, overbased detergents, anti-wear agents, friction reducing agents, viscosity improvers, viscosity thickeners, metal passivators, acid sequestering agents and antioxidants.

16. A cylinder oil formulation according to claim 15, wherein the oil comprises an overbased detergent, a dispersant and a hazy paraffinic base oil and wherein the kinematic viscosity at 100° C. of the cylinder oil formulation is between 12 and 22 mm$^2$/sec.

17. A rubber composition comprising a base oil blend according to claim 1, and further comprising at least one rubber or rubber component.

\* \* \* \* \*